ELECTROSTATIC MEMORY SYSTEM

Filed May 15, 1953 3 Sheets-Sheet 1

Pulse Routine Timing

INVENTOR
Jeffrey C. Chu
BY
Roland A. Anderson
ATTORNEY

Sept. 23, 1958 JEFFREY C. CHU 2,853,695

ELECTROSTATIC MEMORY SYSTEM

Filed May 15, 1953 3 Sheets-Sheet 2

INVENTOR
Jeffrey C. Chu
BY
Roland A. Anderson
ATTORNEY

INVENTOR.
Jeffrey C. Chu
BY
Roland A. Anderson
ATTORNEY 2,853,695

ELECTROSTATIC MEMORY SYSTEM

Jeffrey C. Chu, Naperville, Ill., assignor to the United States of America as represented by the United States Atomic Energy Commission Application May 15, 1953, Serial No. 355,351

3 Claims. (Cl. 340—173)

The present invention relates to electrostatic memory systems, and more especially to an improved memory for a digital computer wherein a plurality of storage tubes are adapted to operate in either of two possible modes.

Cathode ray tubes are utilized as the storage elements in the Williams-type memory system, which is described in detail in "Proceedings of the Institution of Electrical Engineers," vol. 96, No. 3, pp. 81–100. In such systems, binary storage is accomplished by storing two different patterns on the tube face, a reading pattern and a storage pattern. Recovery of information is accomplished by directing the cathode-ray beam at the pattern and discriminating between the two alternative signal waveforms induced upon a plate disposed adjacent the tube face when the beam strikes one or the other pattern. As is described in the publication, beam bombardment of a spot on the tube face will produce a region more positive than the surrounding surface, because of secondary emission of electrons from the face. This positive region or spot is known as a "deep potential well." Bombardment of any closely adjacent spot will cause electrons emitted from the adjacent spot to collect on the positive first spot, thereby partially "filling up the potential well" to create a "shallow potential well." The difference in amplitude of the induced signal between that resulting from rebombardment of a shallow well and that resulting from a deep well may be detected by "strobing"; that is, sampling the waveform at a particular time during the reading cycle, and measuring the amplitude of the selected portion to determine which of the two patterns was stored on the spot interrogated. Presently available cathode ray tubes contain small impurities which impair storage of information in an electrostatic memory system. A pin-hole or a carbon deposit in the storage phosphor may prevent the electron beam from producing the desired deep potential well at a particular spot on the storage raster. Then the bit of information stored may easily be mistaken for that which is stored as a shallow potential well when the spot is again read or consulted.

To overcome the above difficulty it would be possible to run two complete memory systems in parallel, compare the signals from each, and always accept that signal indicative of a deep potential well, if such signal were present. A chance of finding impurities at the same raster point on two storage tubes is negligibly small, so that reliable memory could thus be provided. But duplication of the entire memory is impracticable both because of the great cost and because the increased number of components required would make for too poor reliability.

Accordingly, it is a primary object of the present invention to provide an electrostatic memory using commercially available cathode ray storage tubes wherein the effect of impurities in the tube on reliability of a memory is minimized.

A further object of the present invention is to provide an improved memory system of flexible design capable of operation in either of two possible modes.

Another object of the present invention is to provide a novel storage or memory system for use with an associated digital computer.

Other objects and advantages of the invention will become apparent from the following detailed description of a preferred embodiment thereof when made in connection with the appended drawings, in which.

Figure 1:
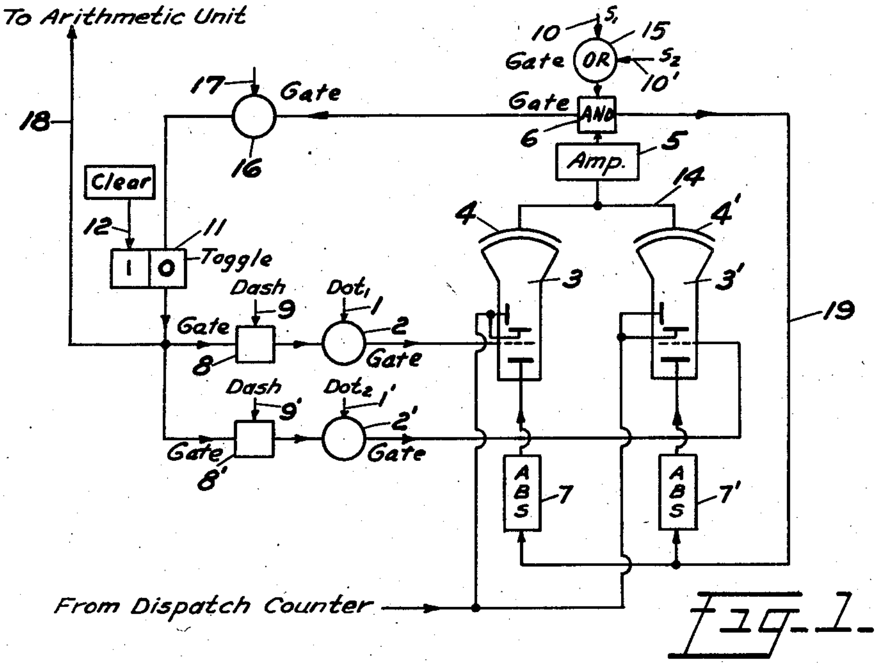
Figure 1 is a block diagram showing the major functional and logical components of one stage of a plurality of identical denominationally-ordered stages in my improved memory system.

According to the present invention, duplicate storage tubes are provided for each denominational order of the several binary digits. A single discriminator system is provided between corresponding duplicate tubes to determine the character of the information stored in each. If either tube produces the selected type signal, corresponding to binary "1" in the preferred embodiment, a "1" is regenerated in both tubes. In one mode of operation each bit of information is stored in two corresponding tubes, while in the other mode of operation each bit is stored in only one tube in the conventional manner. A time multiplex system of memory accession and utilization is provided so that in both modes the corresponding storage tubes may use common circuitry. Clock signals are fed to each denominationally ordered unit simultaneously in parallel so that the several identical stages provided may store or deliver an entire word of several digits.

In the preferred embodiment of the invention, the dot-dash display type of storage is used. The dot regenerates a "0," while dot-dash regenerates a "1." Referring now to Figure 1, storage tubes 3, 3′ constitute the basic storage elements, and may be cathode ray tubes of the type 3JP1. Pick-up plates 4, 4′ are disposed over the external faces of the corresponding storage tubes in the manner described by Williams, supra. The pick-up plates are coupled together by lead 14 and connected to the input circuit of amplifier 5. The amplifier is connected to a gating circuit 6, which may be of the logical "and" type. Control pulses "strobe 1" and "strobe 2" may be applied as inputs to the logical "or" gate circuit 15, the output of which is used to enable gate 6. The output of gate 6 is coupled through logical "or" gate 16 to set toggle 11. A bit of information may be coupled to the toggle through gate 16 from an external source such as the arithmetic unit of an associated computer, on lead 17. Toggle 11 may be cleared to a predetermined state by pulsing lead 12, in the conventional manner. An output voltage level indicative of the state of the toggle may be coupled to the associated computer arithmetic unit through lead 18, and to the intensity grids of both storage tubes 3, 3′ through gates 8, 2 and 8′, 2′. The gates 8, 8′ are of the logical "and" type and require an enabling signal upon associated leads 9, 9′. The gates 2, 2′, being of the logical "or" type will pass either a signal from the associated "and" gates or an input signal on leads 1, 1′.

The amplifier signal is conducted along lead 19 and may be utilized to determine the cathode bias of the storage tubes through an automatic beam stabilization control, which unit is described completely in co-pending application S. N. 362,086 filed June 16, 1953, by R. J. Klein, now U. S. Patent No. 2,770,756.

Figure 3:
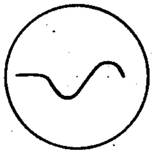
Figure 3 is a typical wave form resulting from reading a stored binary digit "0."
Figure 2:
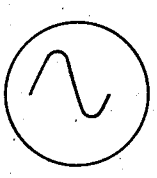
Figure 2 is a typical wave form derived from reading a stored binary digit "1."
Figure 5:
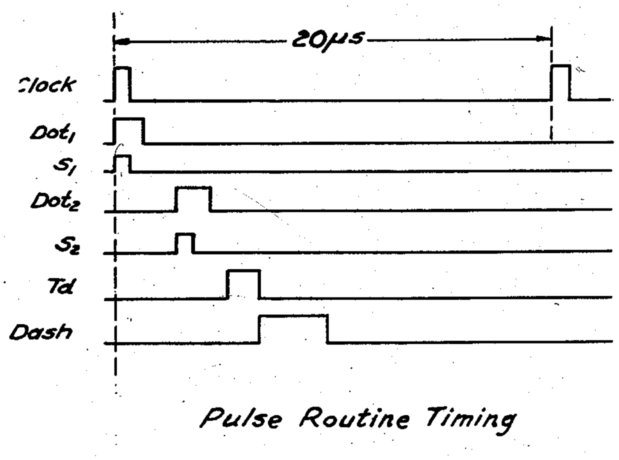
Figure 5 illustrates the sequency and duration of a series of control pulses which should be generated to cause my improved memory system to operate in the desired manner.

Referring briefly to Figure 5, it is apparent that the "strobe 1" and "strobe 2" pulses will enable gate 6 only during brief portions of one regeneration cycle. This interval is selected at the beginning of the signal read by the amplifier. If a shallow potential well, indicating a binary "1," was struck by beam turn on in tube 3, the output signal from the amplifier would have the wave form shown in Figure 2. This signal would pass through gate 6 during the stroke interval, pass gate 16, and flip toggle 11 to the "1" position. But if a deep well, corresponding to a stored "0" were struck by beam turn on in tube 3, the signal produced would have the wave form shown in Figure 3, which is substantially opposite in polarity of Figure 2. Gate 6 would reject that signal during the strobe interval, so that no pulse would pass to flip toggle 11.

Figure 4:
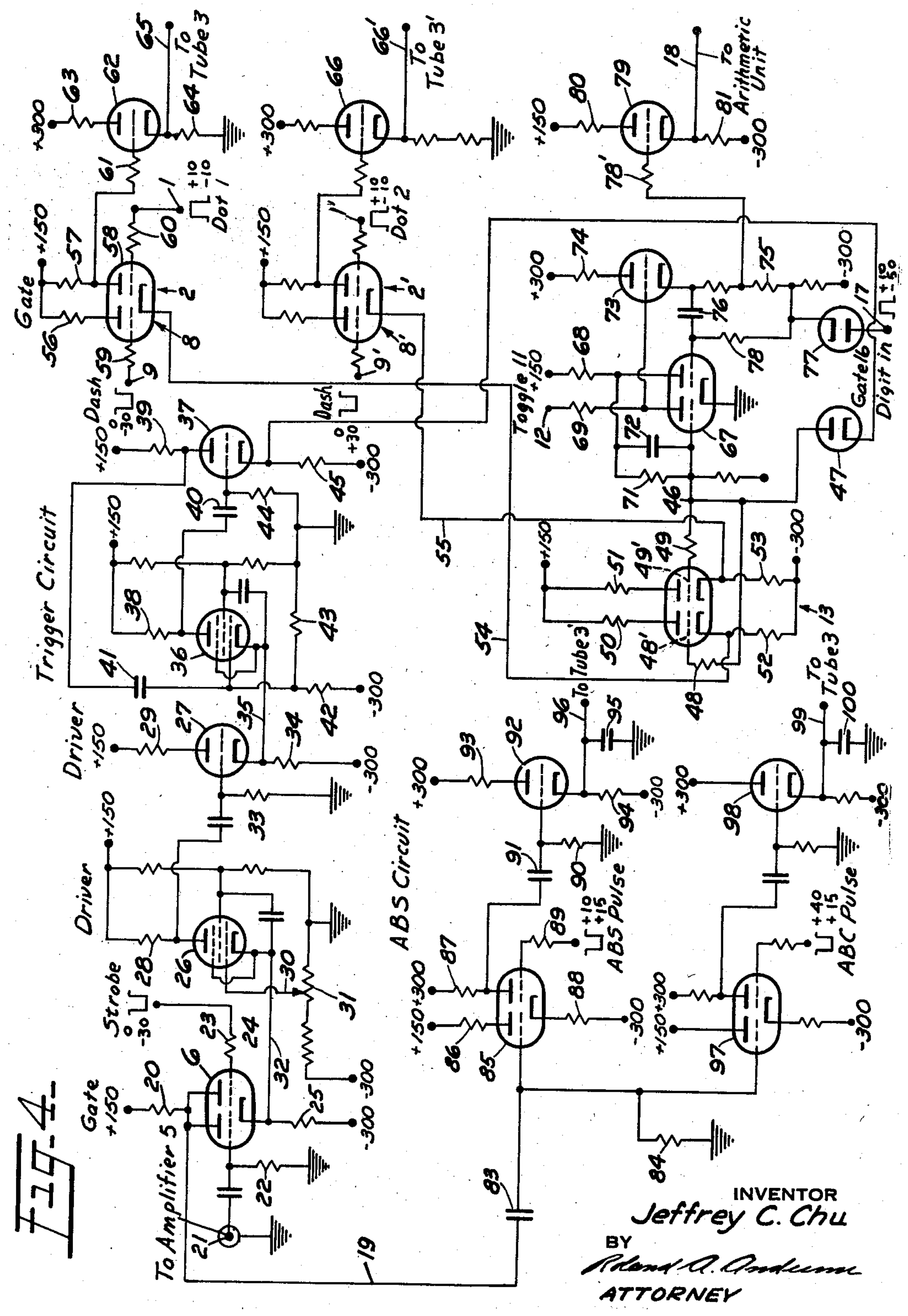
Figure 4 is a schematic circuit diagram illustrating the preferred electronic design of a single stage corresponding to the logical or block diagram of Figure 1.

Referring now to Figure 4, gate tube 6 may be of the 6J6 twin-triode type having both anodes coupled together and connected through a resistor 20 to a source of +150 volts. The left grid may be R–C coupled to input terminal 21, while the right grid may be coupled through a resistor 23 to a source 24 of negative "strobe" pulses (0 to −30 volts). The common cathode may be coupled through a resistor 25 to a source of −300 volts. Tubes 26, 27 form a driver unit for a trigger circuit comprising tubes 36, 37. The pentode 26 may be type 6AK5, while triode 27 may be one section of a type 5687 tube. The anodes of the tubes may be connected through respective resistors 28, 29 to a source of +150 volts. The cathode of tube 26 is coupled to the cathode of tube 6 through lead 32, while the grid of tube 26 is coupled to the movable arm 30 of a potentiometer 31 forming part of a voltage dropping network between ground and a source of −300 volts. The anode of tube 26 is R–C coupled to the grid of tube 27, the cathode of which is returned to a source of −300 volts through resistor 34. Tube 27 is cathode-coupled to tube 36 along lead 35. The trigger circuit comprises pentode 36, which may be of the type 6AK5, and triode 37, which may be one section of a type 5687 tube. The anodes of the trigger circuit tubes are coupled to a source of +150 volts through respective resistors 38, 39, and are also cross-coupled to the grids of the opposite tubes by capacitors 40, 41. The control grid of the left tube is returned to a source of −300 volts through resistor 42 and to ground through resistor 43, while the control grid of the right tube is returned to ground through resistor 44. The cathode of tube 37 is connected to a source of −300 volts through resistor 45 and also to junction 46 through diode 47 to drive toggle 11.

Junction 46 is coupled to the control grids of both right and left sections 49', 48' of gate driver 13. The anodes of both tubes are coupled to a source of +150 volts through respective resistors 50, 51, while the cathodes are coupled through respective resistors 52, 53 to a source of −300 volts. Output leads for driving the gates are taken along leads 54, 55 to the respective cathodes of the twin-triodes comprising gates 8, 8' and 2, 2'. Gates 2 and 8 may comprise a twin-triode of the 6J6 type having its anodes connected through resistors 56, 57 to a source of +150 volts. The left grid of twin-triode 58 is coupled through resistor 59 and lead 9 to a source of "dash" signals, which may be negative signals going from 0 to −30 volts. The right grid is coupled through resistor 60 and lead 1 to a source of "dot" signals, which may be positive pulses going from −10 to +10 volts. The anode of the right-hand section of tube 58 is coupled through resistor 61 to the grid of cathode follower tube 62, which may be one triode section of a 12AU7 type tube. The anode of tube 62 is connected to a source of +300 volts through a resistor 63, while the cathode is connected to ground through resistor 64 and to output 65. Gate 2', 8' and its associated cathode follower 66 may be identical to gate 2, 8 and cathode follower 62, and deliver an output at terminal 66'. Outputs 65, 66' are coupled to the intensity grids of cathode ray tubes 3, 3', respectively, to control the beams thereof.

Junction 46 is also coupled to the left hand triode section of toggle 11. The toggle may comprise twin-triode 67, having a common cathode connected to ground and having respective anodes connected through resistors 68, 69 to separate sources of +150 volts and +110 volts, respectively. Provision is made in source 70 for lowering the voltage on lead 12 from +110 to +50 volts in order to reset toggle 11 to a predetermined condition. The anode of the right hand section of tube 67 is coupled through resistor 71 and capacitor 72 to the grid of the left hand section. The anode of the left hand section is coupled to the control grid of tube 73, which may be one section of a type 12AU7 twin-triode tube. The anode of tube 73 is connected to a source of +300 volts through resistor 74, while the cathode is connected through a voltage divider 75 to a source of −300 volts. Capacitor 76 couples the cathode of tube 73 with the control grid of the right hand section of tube 67 and also with input diode 77 through resistor 78. The diode is coupled to the Arithmetic Unit of an associated computer, or other external source of positive going pulses which may go from −50 volts to +10 volts thus serving as gate 16 for setting toggle 11, as heretofore described. A point on the cathode voltage divider is coupled through resistor 78' to the control grid of cathode follower 79, which may be one-half section of a 12AU7 type tube. The anode of the tube is coupled through resistor 80 to a source of +150 volts, while the cathode is coupled through resistor 81 to a source of −300 volts and also to output terminal 18 leading to the Arithmetic Unit.

The inter-connected anodes of gate tube 6 are coupled through capacitor 83 and resistor 84 to a pair of identical stages, of the automatic beam stabilization circuits, described in the Klein application, supra. One stage comprises twin-triode 85, which may be of the 12AT7 type having its anodes connected respectively through resistors 86, 87 to sources of +150 and +300 volts. The common cathode is returned through resistor 88 to a source of −300 volts, and the control grid of the right hand section is coupled through resistor 89 to a source of input control pulses adapted to swing from +40 to +15 volts. Tube 85 thus serves as a difference amplifier to compare the standard pulse on the right section with the pulse from tube 6. Resistor 87 is coupled through resistor 90 and capacitor 91 to the control grid of triode 92, which may be one section of a 12AT7 type triode. The anode of tube 92 may be coupled through resistor 93 to a source of +300 volts while the cathode may be returned through resistor 94 to a source of −300 volts. Capacitor 95 may be coupled between output terminal 96 and ground. An identical stage comprises tubes 87, 98 and output terminal 99. Outputs 99, 96 are coupled to cathode ray tubes 3, 3' and serve to control the bias voltage thereon, thereby determining the beam intensity in the manner more fully described in the Klein application, supra.

Figure 6:
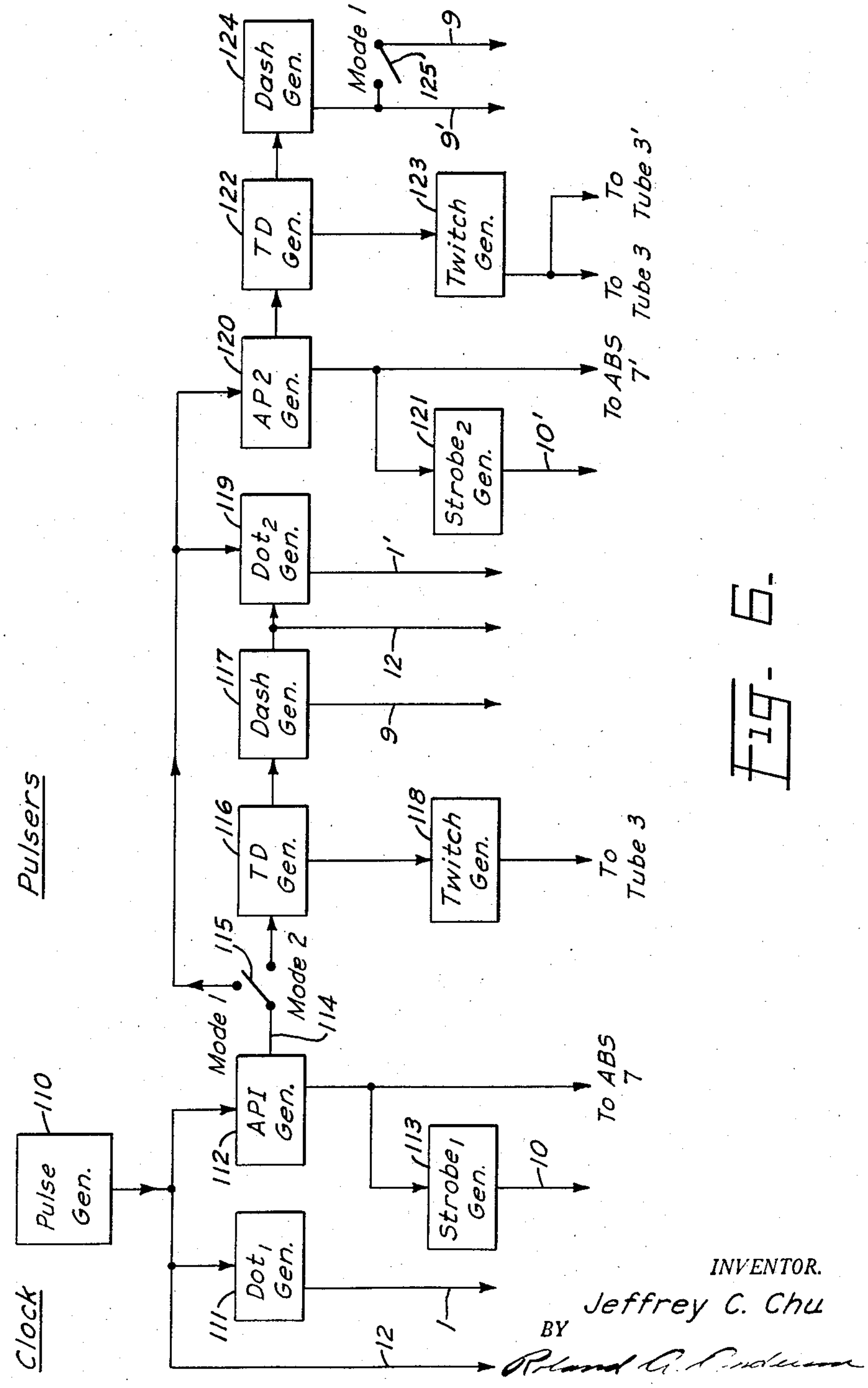
Figure 6 illustrates schematically a suitable pulse routine generator.

Figure 5 illustrates a sample of proper pulse routine timing for operation of the apparatus above disclosed. A master clock generates a positive pulse every 20 microseconds. A single pulse routine is completed in substantially 15 microseconds. The "clock 1" and "strobe 1" pulses occur at time $T_0$, the "dot 2" and "strobe 2" pulses occur at time $T_3$. The digit is transferred in at time $T_5$, and the "dash" pulse occurs at time $T_6$. The symbols to the left of the timing chart correspond to those in Figure 1 showing where the pulses are applied to the system. Any suitable pulse routine generator may be utilized, such as that described by Smith in the "Sixth Annual Progress Report of the Institute for Advanced Study Computer Project." As is described in that report, the required pulse routines may be generated by a series of pulsers, or individual pulse generators, actuated by a master clock or pulse generator which operates at a selected frequency. A similar, suitable pulse routine generator is shown and described in the co-pending application of R. J. Klein, referred to above. As is shown in Figure 5, the clock generates one clock pulse each 20 microseconds. The clock pulse in turn actuates certain pulsers which deliver pulses to indicated numbered leads in the logical diagram of Figure 1. The pulses proceed in order, with one pulser triggering the next. For example, referring now to Figure 6, clock pulses may be generated by the pulse generator 110. This pulse (1) causes a "clear" signal to appear on lead 12 which leads to toggle 11, (2) triggers $dot_1$ generator 111, causing a pulse to appear on lead 1, and (3) triggers the AP1 generator 112 which delivers a timing pulse for use in the ABS circuit 7 and which also triggers the $strobe_1$ generator 112, causing a pulse to appear on lead 10.

At the end of the pulse from the AP1 generator, a pulse appears on lead 114. Switch 115 is provided to select the desired double or single mode of operation described below. Assuming switch 115 is set in the "mode 1" position, this pulse will trigger the $dot_2$ generator 119 and the AP2 generator 120, causing pulses to appear on lead 1' and a lead connected to the ABS circuit 7'. The latter pulse also triggers $strobe_2$ generator 121, causing a pulse to appear on lead 10'. At the end of the AP2 pulse, the twitch delay generator (TD Gen.) is triggered, actuating the twitch generator 123, which is coupled to tubes 3, 3' to move the writing beam in the conventional manner. At the end of the TD pulse the dash generator 124 is triggered, causing a pulse to appear on lead 9' and also upon lead 9 if the switch 125 is thrown to the "mode 1" (closed) position.

To obtain the extra twitch and dash pulses required for operation in mode 2, when the tubes are interrogated successively and regenerated successively, as is described in detail hereinafter, switch 115 is thrown to the "mode 2" position, connecting the AP1 pulse to trigger the TD generator 116. A pulse is then applied to twitch generator 118, which is coupled to tube 3 in the conventional manner. At the end of the TD pulse, dash generator 117 is triggered, delivering an output on lead 9. At the end of the dash pulse, a second clear pulse is delivered on lead 12 to clear toggle 11 and then $dot_2$ generator is actuated. The remainder of the pulse sequence is exactly as described for "mode 1" except that switch 125 is open.

Operation in mode 1 according to the pulse routine may be as follows: At time $T_0$, a "clear" pulse is impressed on input 12 to reset toggle 11 to the state corresponding to binary "0." Simultaneously, a "dot 1" pulse on input 1 turns on the beam in tube 3, producing an output pulse on lead 14 responsive to the bit of information stored in the tube. Also, simultaneously, the "strobe 1" pulse on input 10 passes gate 15 and enables gate 6 by way of lead 24. During the brief enabled interval gate 6 receives a portion of the output signal from amplifier 5. A "1" signal, corresponding to the wave form of Figure 2, will pass through gate 6 and also pass gate 16 and flip toggle 11 to its other or "1" position. However, if a shallow well or "0" signal occurs at the output of amplifier 5, the signal will be rejected by gate 6 and toggle 11 will remain in its initial condition. Circuitwise, the right section of tube 6 is cut off by the "strobe 1" pulse, so that if a negative "1" pulse occurs on lead 21, tube 6 will be entirely cut off. The resulting negative pulse on lead 32 is strengthened in driver 26 and utilized to trip the trigger circuit through lead 35. The trigger circuit produces a sharply defined, stable output pulse to drive toggle 11, insuring accurate operation thereof by each pulse.

At time $T_3$ a "dot 2" pulse and "strobe 2" pulse will enter inputs 1', 10', respectively, to scan tube 3' in the identical manner.

The "strobe 2" pulse passes gate 15 and enables gate 6 by way of lead 24 during a short interval at the beginning of the signal read from tube 3'. A "1" signal will pass through gate 6, pass gate 16 and flip toggle 11, while a "0" signal will not pass gate 6 during the strobe interval. Therefore, it is apparent that toggle 11 will register "1" if either or both storage tubes deliver a "1" signal. An output lead from the toggle controls the operation of gates 8, 8' through gate drivers 48', 49 and leads 54, 55, closing them for a "1" signal and opening them for a "0" period.

At time $T_5$ the beams in the tubes 3, 3' are deflected or "twitched" by a signal from the twitch deflection generator of an associated computer in the conventional manner. Since both "dot 1" and "dot 2" pulses have decayed, the intensity grids of neither tube is energized, and both beams are turned off.

At time $T_6$ a five microsecond pulse is delivered from the pulse routine generator on leads 9, 9' to the gates 8, 8'. If these gates are open or enabled by the signal on leads 54, 55, a "dash" pulse will be transmitted through the gates, through gates 2, 2' to the intensity grids of both storage tubes to again turn on the beam at the displaced position. Thus the charge pattern at the normal raster point under surveillance will be disturbed by the incidence of the displaced beam, making a shallow well or "0" pattern appear at the normal point. But if gates 8, 8' are closed by the enabling signal on leads 54, 55, the dash pulse cannot get through to intensify the electron beams, so the undisturbed or "1" signal will remain on the storage surface.

In mode 2 operation, where each storage tube represents a different denomenationally ordered binary digit, the pulse sequence shown in Figure 5 is altered by providing additional "twitch" and "dash" pulses for tube 3 after the "dot 1" and "strobe 1" pulses but before the "dot 2" and "strobe 2" pulses for tube 3'. In such operation each pulse after the first three shown on the chart would be displaced substantially six microseconds to the right because of the extra pulses that are required. Each tube is read separately and its information is utilized along the common circuitry before the other tube of the pair is inspected. Thus, the mode of operation selected for the memory system is determined by the pulse sequence selected from the pulse routine generator.

I claim:

1. In a memory system for computers and the like provided with a plurality of denominationally ordered stages for storing correspondingly ordered binary digits, the improvement comprising a pair of cathode ray storage tubes, each tube having means for establishing an electron beam therein, deflection electrodes for directing said beam about said tubes to normal and displaced raster positions, a source of deflection voltages coupled to said electrodes, and a pick up plate adjacent the tube face for detecting electrical signals; a pulse amplifier provided with input and output circuits, said input circuit being coupled to both said pick-up plates; first and second coupling gate circuits each having a first input coupled to a corresponding external source of beam intensification pulses to read out information stored in respective tubes responsive to receipt of respective beam intensification pulses, and an output coupled to respective beam establishing means in said tubes; a first blocking gate circuit having a first input coupled to said amplifier output circuit, a second input coupled to a source of external enabling strobing pulses, and an output, said blocking gate producing an output signal only upon coincidence of a signal of a selected binary character on said first input and an enabling signal; a third coupling gate circuit having a first input coupled to the output of said blocking gate, a second input coupled to a source of binary signals to be stored, and an output; a bistable device having an input and an output, said input being coupled to the output of the third coupling gate; and second and third blocking gate circuits each having a first input coupled to said toggle output, an output coupled to one input of said first and second coupling gate circuits, respectively, and a second input coupled to respective sources of external beam intensification signals, to store information in respective tubes corresponding to the state of said bistable device upon receipt of respective beam intensification signals.

2. In an electrostatic memory of the character described a binary storage unit comprising two storage tubes provided with interconnected output electrodes, a bistable device provided with an output capable of assuming two selected voltage levels and with an input which is coupled to both said output electrodes, means for consulting one of said tubes to produce an output signal of a first or second character, corresponding to a stored charge pattern, means for consulting said second tube to produce a second signal, means for setting said bistable device to a selected state repsonsive to a signal of selected binary character from at least one of said tubes, and means responsive to the voltage level asumed by said output for regenerating a selected binary storage pattern in both of said tubes corresponding to the state of said bistable device.

3. An improved electrostatic memory unit operable in first and second modes comprising: pulse generating means to generate a first and a second series of pulses corresponding to said operational modes; selector means to select the one series to be generated at a given time; first and second storage tubes provided with interconnected pick-up plates and respective beam establishing and beam deflecting elements; means responsive to a first pulse in a series from said generating means to establish a beam in said first tube to interrogate a selected point therein; a single pulse amplifier coupled to both said pick-up plates and provided with an output to receive a binary signal corresponding to the charge condition of said selected point; a single bistable device provided with an output lead which assumes one of two alternative voltage levels; and gating means responsive to both the voltage level on said output lead and to a second pulse in a series from said generating means to set said bistable device to a state corresponding to the binary character of said amplifier output signal; means to regenerate a selected charge condition in said first tube responsive to coincidence of a third pulse in said second series and a selected voltage level of said output lead; means responsive to a fourth pulse in said second series to reset said bistable device to a selected state; means responsive both to a fifth pulse of said second series and to a third pulse of said first series to establish a beam in said second tube to interrogate a selected point in the same; means for receiving selectively a sixth pulse of said second series or a fourth pulse of said first series for coupling the pulse received to said gating means to set said bistable device to correspond to the charge condition of a selected point in said second tube; means to regenerate a selected charge pattern in said second tube responsive to coincidence of a seventh pulse of said second series with a selected level on said output lead; and means to regenerate a selected charge pattern in both said tubes responsive to coincidence of said selected output level on said output lead with a fifth pulse of said first series.

References Cited in the file of this patent

UNITED STATES PATENTS

| | | |
|---|---|---|
| 2,617,963 | Arditi | Nov. 11, 1952 |
| 2,645,712 | Rajchman et al. | July 14, 1953 |
| 2,702,356 | Flory | Feb. 15, 1955 |
| 2,739,236 | Holt | Mar. 20, 1956 |
| 2,785,855 | Williams et al. | Mar. 19, 1957 |
| 2,807,005 | Wiedenhammer | Sept. 17, 1957 |

OTHER REFERENCES

Proceedings of the I. R. E., vol. 38, Issue 5, May 1950, "A Dynamically Regenerated Electrostatic Memory System."